Nov. 6, 1928.  1,690,961
G. YOSHINAGA
AUTOMOBILE BUMPER
Filed Jan. 13, 1927   2 Sheets-Sheet 1
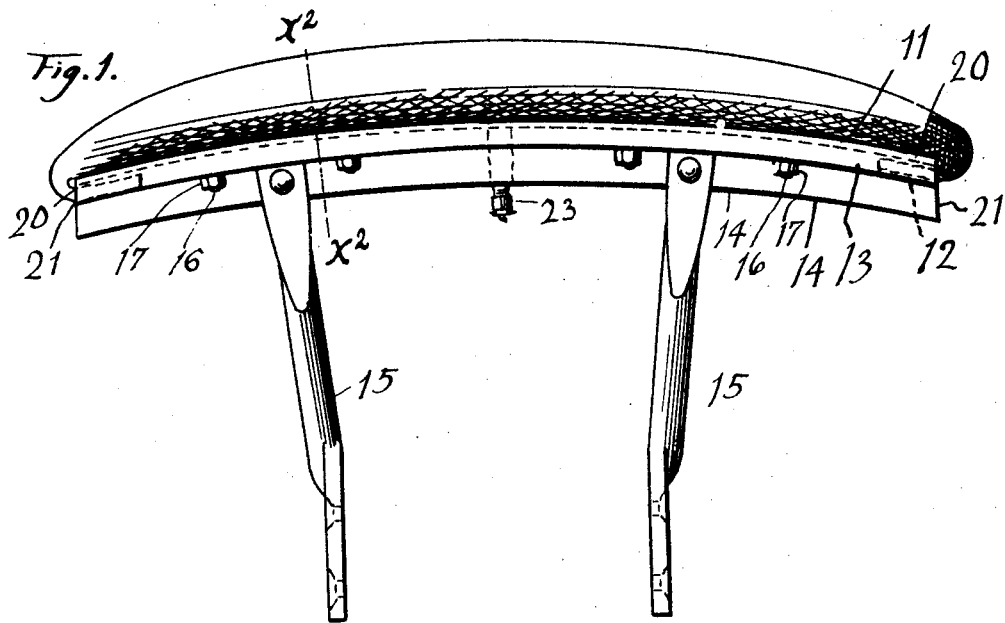
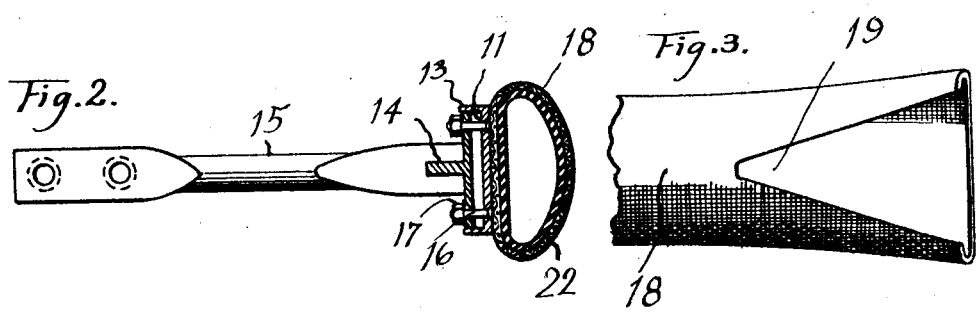 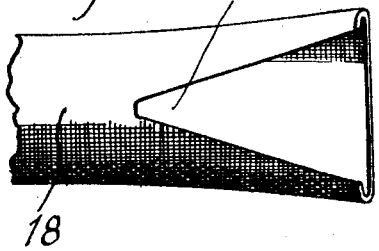
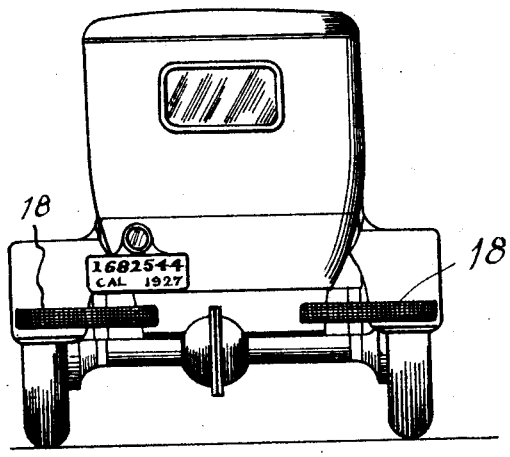
INVENTOR:
GENGIRO YOSHINAGA.
BY ATTY:

Nov. 6, 1928.
G. YOSHINAGA
1,690,961
AUTOMOBILE BUMPER
Filed Jan. 13, 1927   2 Sheets-Sheet 2
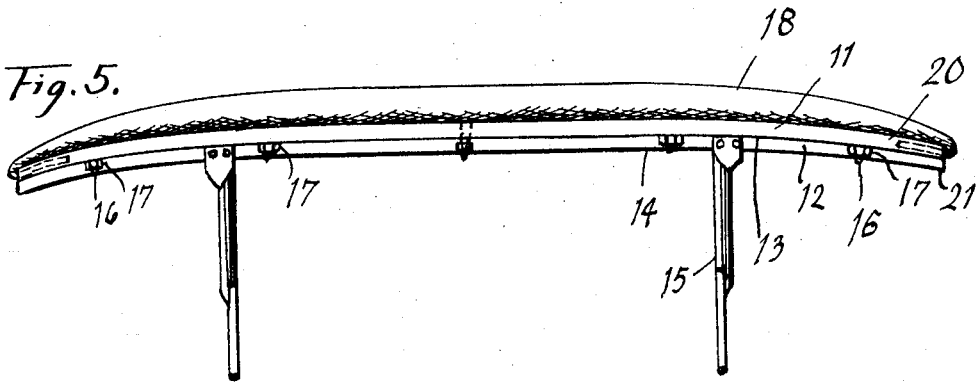
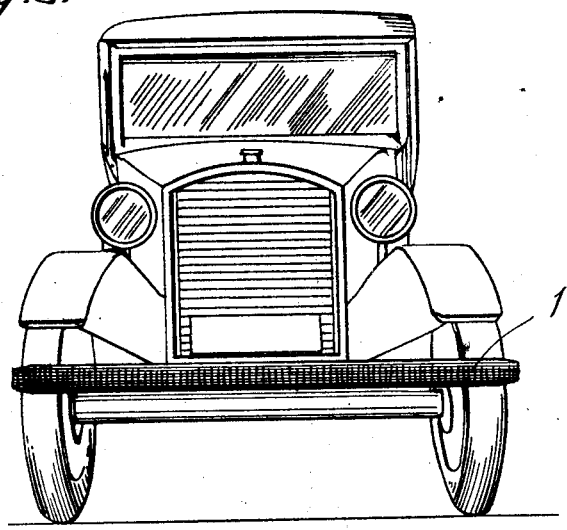
INVENTOR:
GENGIRO YOSHINAGA.
BY ATTY:

Patented Nov. 6, 1928.

1,690,961

UNITED STATES PATENT OFFICE.

GENGIRO YOSHINAGA, OF LOS ANGELES, CALIFORNIA.

AUTOMOBILE BUMPER.

Application filed January 13, 1927. Serial No. 160,888.

This invention relates to improvements in automobile bumpers, and its objects are to provide a bumper which will withstand ordinary bumps without injury and without becoming bent or distorted in shape, and to provide a bumper which will be capable of being constructed with a minimum cost, and easily installed upon an automobile.

An object of this invention is to provide a bumper of the character set forth which will utilize the resiliency of the air in cushioning shocks and jars that may be sustained by the automobile.

The drawings delineate preferred embodiments merely, and it is to be understood that changes and minor alterations, properly falling within the scope of the appended claims, may be made without departing from the spirit of the invention.

In the drawings, Figure 1 is a top plan view of a bumper constructed in accordance with my invention, Fig. 2 is a sectional view of the bumper taken on line $X^2$—$X^2$, of Fig. 1. Fig. 3 is a fragmentary view of the cushioning fabric showing the inner side of the end cut away. Fig. 4 is a rear elevation of an automobile with the bumper applied thereto. Fig. 5 is a top plan view of the bumper adapted to be applied on the front of the automobile. Fig. 6 is a front elevation of an automobile with the bumper applied thereto.

Referring to the drawings, the bumper embodying the present invention has an outer clamping member 11, and an inner clamping member 12. The outer clamping member has a flange 13 adapted to project over the top of the inner clamping member. The inner clamping member has a flange 14, to which are attached the supporting brackets 15, which are adapted to be secured to the automobile at the preferred location. To force the clamp members together, I provide draw bolts 16, projecting from the outer clamp member, and nuts 17, therefor, on the inner face of the inner clamp member.

To cushion shocks and jars, I provide a collapsible tube 18, of fabric, such as heavy canvas fabric, which is mounted on the outer face of the outer clamp member. The ends of tube 18, are cut away with a notch 19, on the inner side thereof. This allows the ends of the tube to be flattened and inserted between the extremities 20 and 21, of the clamp members. Within tube 18, I provide a collapsible and inflatable rubber tube 22, which is provided with an air valve 23, for inflation thereof.

In use, the inner tubes are inflated, thereby providing an efficient cushioning element for the bumper.

The bumpers may be of the form shown in Fig. 1, which is particularly adapted to be secured to and project from the end of each vehicle spring, or may be of the form shown in Fig. 5, which extends completely across the front or rear of the automobile.

By providing means for constricting the ends of the outer fabric member, the same may be of larger dimensions than the clamp members, as shown.

From the foregoing description and drawings, it may be seen that I have provided an improved bumper which is inexpensive to construct, is readily applied for use, and which will efficiently withstand the ordinary shocks and jars incident to ordinary use.

What is claimed is:

1. In an automobile bumper, outer and inner clamp members, supporting brackets extending from the inner clamp member, means for drawing the clamp members together, a flexible fabric tube mounted on the outer face of the outer clamp member and having its extremities inserted between the clamp members, and an inflatable tube mounted within the flexible fabric tube.

2. In an automobile bumper, the combination with outer and inner clamp members and means for drawing the clamp members together, of supporting means extending from the inner clamp member, a flexible fabric tube mounted on the outer face of the outer clamp member, and having its extremities capable of constriction for insertion between the clamp members, and an inflatable member disposed in the fabric tube.

3. In an automobile bumper, the combination with outer and inner clamp members and means for drawing the clamp members together, of supporting means extending from the inner clamp member and adapted to be secured to the automobile, a flexible fabric tube mounted on the outer face of the outer clamp member, and having its extremities inserted between the clamp members, an inflatable tube within the fabric tube, and valve means for inflating the inner tube.

In testimony whereof, I hereunto affix my signature.

GENGIRO YOSHINAGA.